(12) United States Patent
Ramasamy et al.

(10) Patent No.: US 12,535,391 B2
(45) Date of Patent: *Jan. 27, 2026

(54) MEASURING INDOOR AIR QUALITY FOR A HEATING, VENTILATION, AND AIR CONDITIONING SYSTEM

(71) Applicant: Lennox Industries Inc., Richardson, TX (US)

(72) Inventors: Surendran Ramasamy, Chennai (IN); Henry Greist, Gainesville, FL (US); Sanjeev Hingorani, Gainesville, FL (US); Calvin Michaelis, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/759,923

(22) Filed: Jun. 30, 2024

(65) Prior Publication Data

US 2024/0353296 A1 Oct. 24, 2024

Related U.S. Application Data

(63) Continuation of application No. 17/718,084, filed on Apr. 11, 2022, now Pat. No. 12,061,137.

(51) Int. Cl.
| | |
|---|---|
| *G01N 1/22* | (2006.01) |
| *F24F 11/89* | (2018.01) |
| *F24F 110/64* | (2018.01) |
| *F24F 110/66* | (2018.01) |
| *F24F 110/70* | (2018.01) |

(52) U.S. Cl.
CPC ............ *G01N 1/2247* (2013.01); *F24F 11/89* (2018.01); *G01N 1/2273* (2013.01); *F24F 2110/64* (2018.01); *F24F 2110/66* (2018.01); *F24F 2110/70* (2018.01)

(58) Field of Classification Search
None
See application file for complete search history.

(56) References Cited

U.S. PATENT DOCUMENTS

| | | | |
|---|---|---|---|
| 10,564,086 B2 * | 2/2020 | Takasu | .................. G01N 15/06 |
| 11,614,384 B2 * | 3/2023 | Birks | .................. G01N 1/2273 |
| | | | 454/69 |

* cited by examiner

*Primary Examiner* — Justin N Olamit (57) ABSTRACT

An air quality measuring device that includes a first chamber, a second chamber, a third chamber, and a fourth chamber. The first chamber includes a first inlet configured to receive a first airflow, a first outlet configured to receive a first portion of the first airflow, and a second outlet configured to receive a second portion of the first airflow. The second chamber includes a second inlet configured to receive the first portion of the first airflow and a first sensor disposed within the second chamber. The third chamber includes a third inlet configured to receive the second portion of the first airflow and a second sensor disposed within the third chamber. The fourth chamber includes a fourth inlet configured to receive the second portion of the first airflow and a third sensor disposed within the fourth chamber.

20 Claims, 10 Drawing Sheets

MEASURING INDOOR AIR QUALITY FOR A HEATING, VENTILATION, AND AIR CONDITIONING SYSTEM

CROSS-REFERENCE TO RELATED APPLICATION

The application is a continuation of U.S. patent application Ser. No. 17/718,084, filed Apr. 11, 2022, entitled "MEASURING INDOOR AIR QUALITY FOR A HEATING, VENTILATION, AND AIR CONDITIONING SYSTEM," which is incorporated herein by reference.

TECHNICAL FIELD

The present disclosure relates generally to Heating, Ventilation, and Air Conditioning (HVAC) system control, and more specifically to measuring indoor air quality for an HVAC system.

BACKGROUND

Heating, ventilation, and air conditioning (HVAC) systems are typically used to regulate the temperature of a room or space. In addition to regulating temperature, HVAC systems also control the comfort level of a space by monitoring the quality of the air that is provided to the space by the HVAC system. The air that is provided to a space may contain various levels of carbon dioxide, particulates, organic compounds, and/or other substances. The HVAC system monitors and controls the amount of substances in the air to ensure an optimal comfort level for the occupants of a space. One of the technical challenges associated with monitoring and controlling the amount of substances in the air is that each of the sensors that are used may have different flow rate and air volume requirements for measuring substances within the air.

SUMMARY

The disclosed system provides several practical applications and technical advantages that overcome the previously discussed technical problems. The following disclosure provides a practical application of an air quality measuring device for a heating, ventilation, and air conditioning (HVAC) system. The disclosed air quality measuring device provides practical applications that improve the resource utilization of the components of an HVAC system. The air quality measuring device is generally configured to provide airflow paths within the air quality measuring device and to position a plurality of sensors within the air quality measuring such that each sensor is configured to measure characteristics or attributes of air that flows through the interior of the air quality measuring device. The sensors are located within different chambers within the air quality measuring device which allows the air quality measuring device to control the flow rate and air volume that is provided to each sensor. This process provides improves resource utilization by dynamically controlling the flow rate and air volume that is provided to each sensor which allows each sensor to more accurately measure the amount of substances in the air to improve the air quality of an HVAC system, and thereby, improves the overall performance of the HVAC system.

In one embodiment, the air quality measuring device includes a first chamber, a second chamber, a third chamber, and a fourth chamber. The first chamber includes a first inlet configured to receive an airflow, a first outlet configured to receive a first portion of the airflow, and a second outlet configured to receive a second portion of the airflow. The second chamber includes a second inlet configured to receive the first portion of the airflow and a first sensor disposed within the second chamber. The third chamber includes a third inlet configured to receive the second portion of the airflow and a second sensor disposed within the third chamber. The fourth chamber includes a fourth inlet configured to receive the second portion of the airflow and a third sensor disposed within the fourth chamber.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
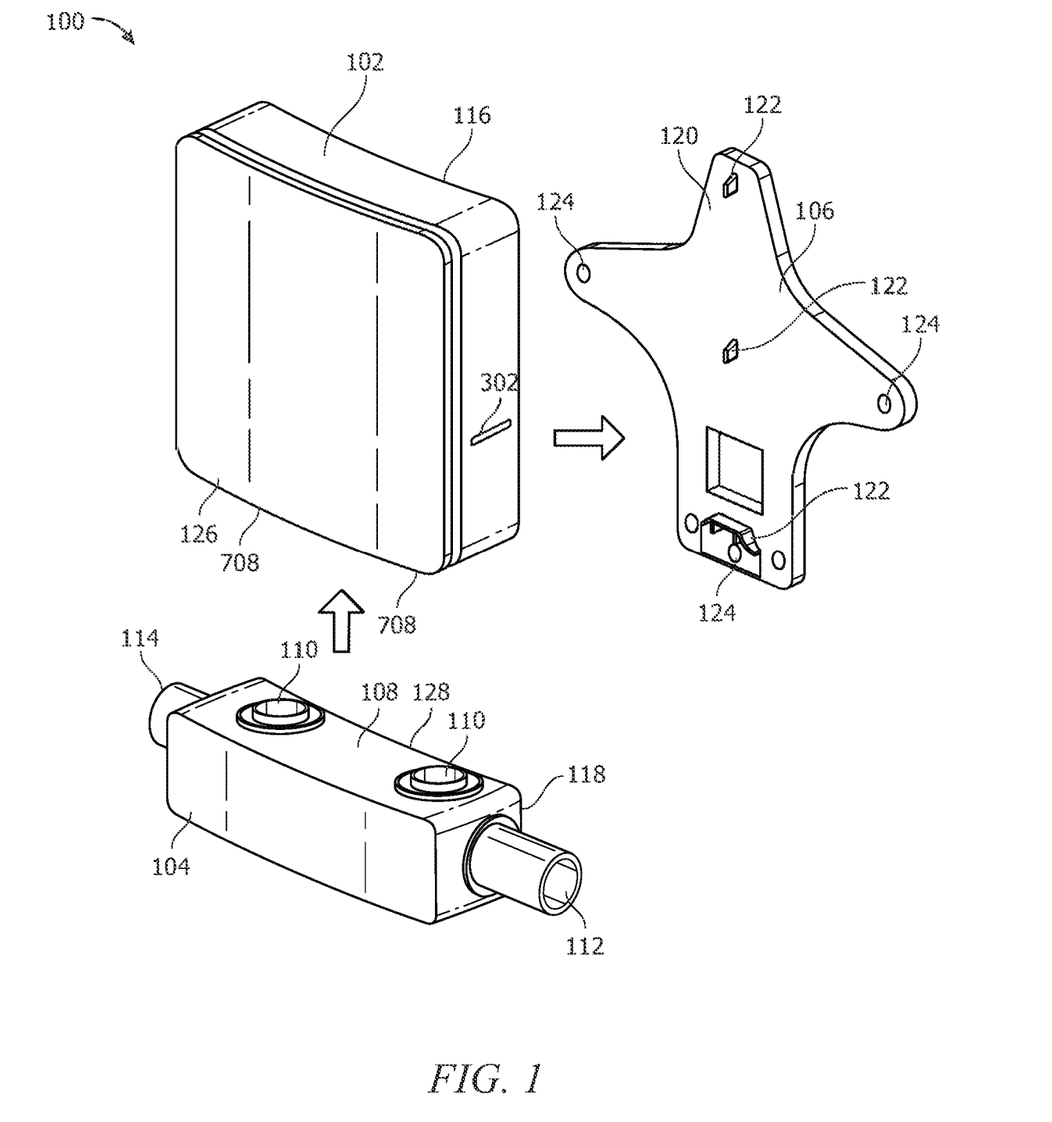
FIG. 1 is an exploded view of an embodiment of an air quality measuring device for an HVAC system.

FIG. 1 is a schematic diagram of an embodiment of an air quality measuring device 100 for heating, ventilation, and air conditioning (HVAC) systems. The air quality measuring device 100 is generally configured to perform measurements to determine the air quality of the air within a space and/or air that is provided by an HVAC system. For example, the air quality measuring device 100 may be configured to measure a carbon dioxide ($CO2$) level, a particulate level, a Total Volatile Organic Compound (TVOC) level, or any other type of substance. The air quality measuring device 100 comprises a plurality of flow paths and chambers that are configured to direct portions of an airflow to the different sensors that are disposed within the air quality measuring device 100.

HVAC System

An HVAC system is generally configured to provide air to a space to control the temperature of the space. Examples of a space include, but are not limited to, a room, a home, an apartment, a mall, an office, a warehouse, or a building. The HVAC system may comprise the air quality measuring device 100, a thermostat, a furnace, compressors, heat pumps, fans, blowers, evaporators, condensers, air ducts, and/or any other suitable type of hardware for controlling the temperature of the space.

Air Quality Measuring Device

Figure 2:
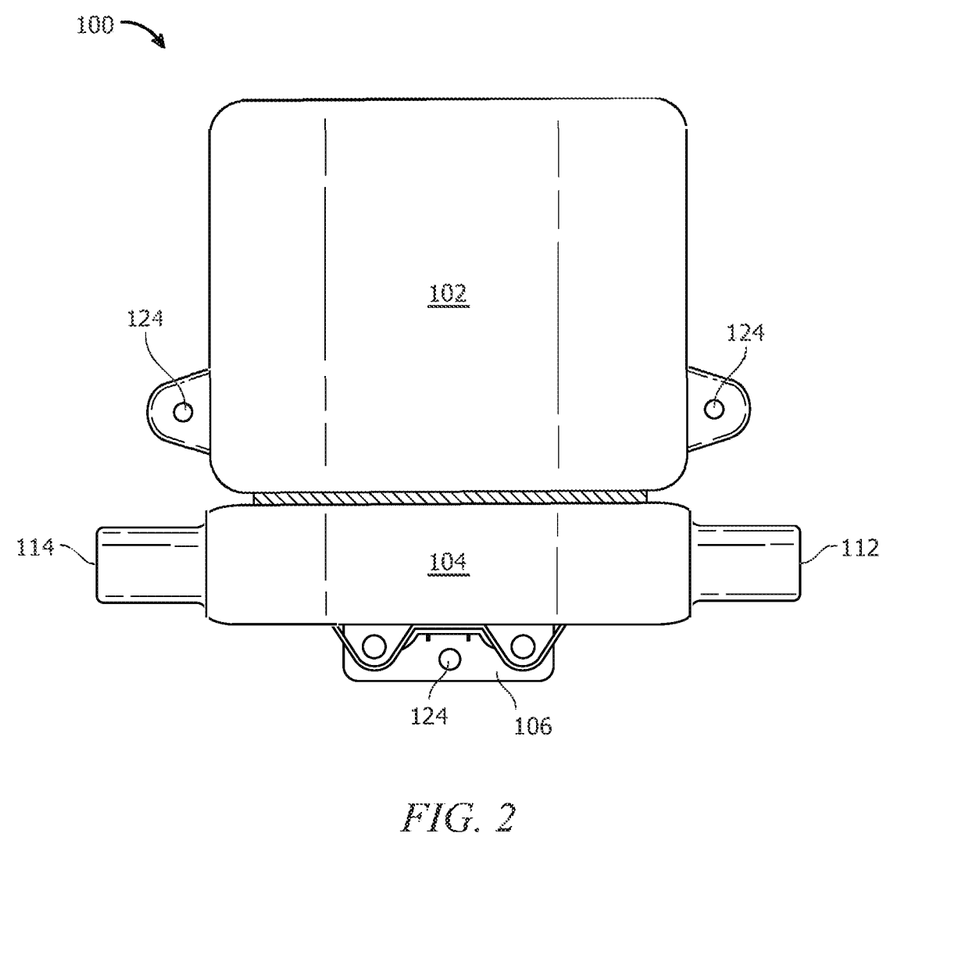
FIG. 2 is a front view of an embodiment of the air quality measuring device.

The air quality measuring device 100 is generally configured to receive air from an HVAC system and to perform measurements on the air to determine the air quality of the air within a space and/or air from the HVAC system. FIG. 1 is an exploded view of an embodiment of an air quality measuring device 100. In one embodiment, the air quality measuring device 100 comprises a sensor housing 102, a bypass housing 104, and a mounting plate 106. An example of the assembled air quality measuring device 100 is shown in FIG. 2.

Sensor Housing

The sensor housing 102 is generally configured to provide airflow paths within the sensor housing 102 and to position a plurality of sensors within the sensor housing 102 such that each sensor is configured to measure characteristics or attributes of air that flows through the interior of the sensor housing 102. Additional details about the airflow paths and the components within the sensor housing 102 are discussed in FIGS. 7-9. The sensor housing 102 may be formed using plastics, metals, or any other suitable type of material. In the example shown in FIG. 1, the sensor housing 102 has a cuboid shape. In other examples, the sensor housing 102 may be any other suitable shape.

The sensor housing 102 is configured to couple with a top surface 108 the bypass housing 104 at a bottom surface 126 of the sensor housing 102. The sensor housing 102 comprises a plurality of openings (e.g. openings 708 shown in FIG. 7) that are configured to align and interface with openings 110 in the bypass housing 104. The interface between the openings 708 of the sensor housing 102 and the openings 110 of the bypass housing 104 may comprise seals, gaskets, or any other suitable type of material or hardware to provide sealed airflow paths between the sensor housing 102 and the bypass housing 104. In some embodiments, the interface between the openings 708 of the sensor housing 102 and the openings 110 of the bypass housing 104 may be configured to provide a friction-based coupling between the sensor housing 102 and the bypass housing 104. In some embodiments, the bypass housing 104 may be omitted. In this case, the openings 708 of the sensor housing 102 may be configured to couple to air ducts of an HVAC system instead of the bypass housing 104. In other embodiments when the bypass housing 104 is omitted, the openings 708 of the sensor housing 102 may be configured to directly sample conditioned air within a space. In this case, one of the openings 708 (shown as opening 916 in FIG. 9) may be configured to draw air into the sensor housing 102 and the other opening 708 (shown as opening 924 in FIG. 9) may be configured to return the sampled air back to the space.

The sensor housing 102 is configured to couple with a front surface 120 of the mounting plate 106 at a back surface 116 of the sensor housing 102. The sensor housing 102 comprises a plurality of interfaces (e.g. interfaces 604 shown in FIG. 6) that are configured to couple with interfaces 122 on the mounting plate 106 to couple the sensor housing 102 with the mounting plate 106. For example, the sensor housing 102 may comprise a plurality of slots or openings that are configured to receive and interface with protrusions on the mounting plate 106 to couple the sensor housing 102 and the mounting plate 106 with each other.

Bypass Housing

The bypass housing 104 is generally configured to provide airflow paths within the bypass housing 104 that send air from an HVAC system to the sensor housing 102 and receive the air back from the sensor housing 102. Additional details about the airflow paths within the bypass housing 104 are discussed in FIG. 9. The bypass housing 104 may be formed using plastics, metals, or any other suitable type of material. In the example shown in FIG. 1, the bypass housing 104 has a cuboid shape. In other examples, the bypass housing 104 may be any other suitable shape.

The bypass housing 104 comprises openings 112 and 114 that are configured to couple the bypass housing 104 to air ducts of an HVAC system. The openings 112 and 114 may be coupled with the air ducts using friction, couplers, fasteners, or any other suitable type of mechanism.

The bypass housing 104 is configured to couple with the front surface 120 of the mounting plate 106 at a back surface 128 of the bypass housing 104. The bypass housing 104 comprises a plurality of interfaces that are configured to couple with interfaces 122 on the mounting plate 106 to couple the bypass housing 104 with the mounting plate 106. For example, the bypass housing 104 may comprise a plurality of slots or openings that are configured to receive and interface with protrusions on the mounting plate 106 to couple the bypass housing 104 and the mounting plate 106 with each other.

Mounting Plate

The mounting plate 106 is generally configured to couple the sensor housing 102 with the bypass housing 104. For example, after coupling the sensor housing 102 and the bypass housing 104 to the mounting plate 106, the mounting plate 106 is configured to fix the position of the sensor housing 102 and the bypass housing 104 with respect to each other which couples the sensor housing 102 and the bypass housing 104 to each other.

The mounting plate 106 is further configured to allow the sensor housing 102 and the bypass housing 104 to be mounted to a surface (e.g. a wall). For example, the mounting plate 106 may comprise one or more slots or openings 124 that are configured to allow mounting hardware (e.g. screws or nails) to pass through the mounting plate 106 to couple the mounting plate 106 to a surface. The sensor housing 102 and the bypass housing 104 may be coupled to the mounting plate 106 before or after coupling the mounting plate 106 onto a surface.

Additional Views of the Air Quality Measuring Device

Figure 3:
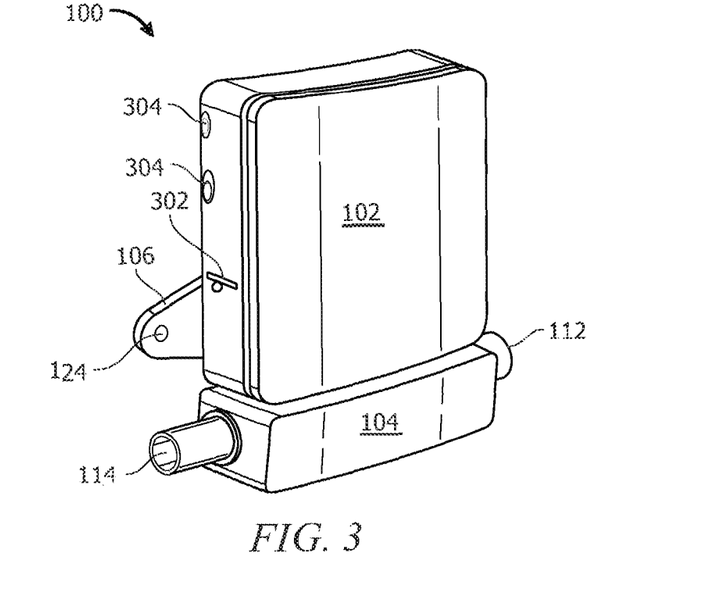
FIG. 3 is a front perspective view of an embodiment of the air quality measuring device.
Figure 4:
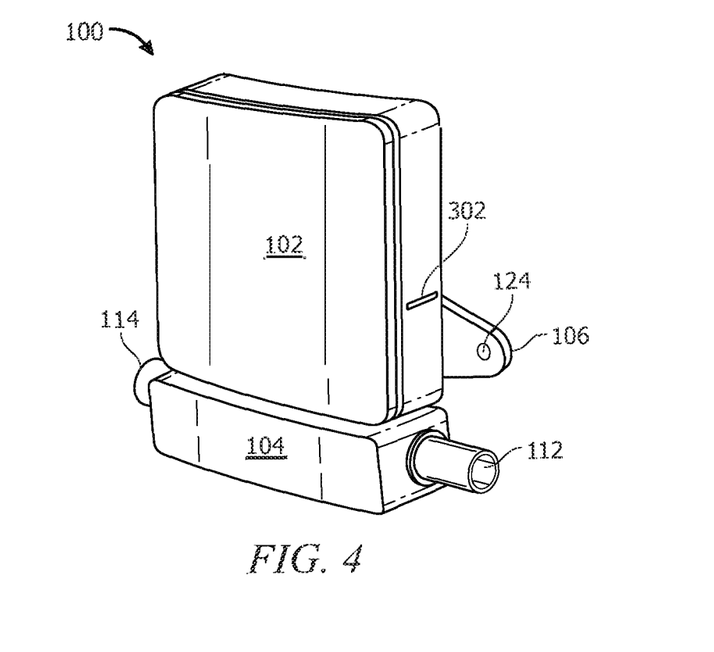
FIG. 4 is another front perspective view of an embodiment of the air quality measuring device.
Figure 5A:
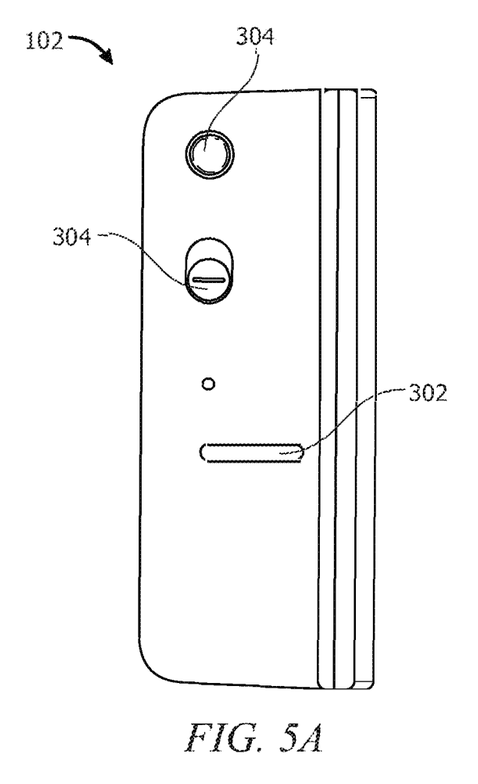
FIGS. 5A and 5B are side profile views of an embodiment a sensor housing of the air quality measuring device.
Figure 5B:
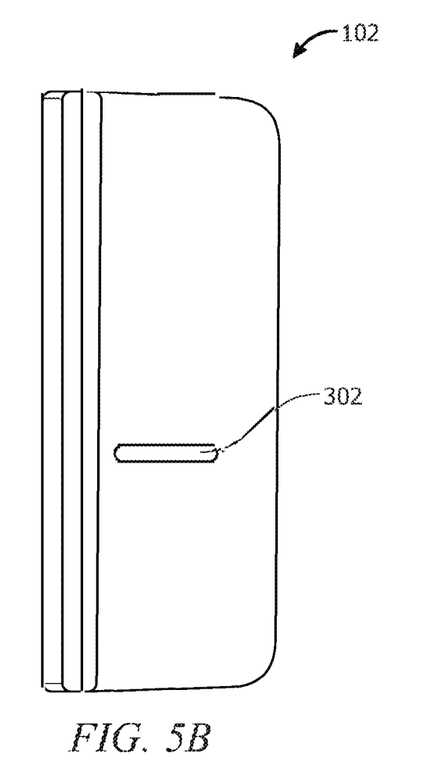

FIGS. 3 and 4 are front perspective views of an embodiment of the air quality measuring device 100. FIGS. 5A and 5B are side profile views of an embodiment the sensor housing 102 of the air quality measuring device 100. In some embodiments, the sensor housing 102 may further comprise one or more side vents 302. Each side vent 302 is configured to provide a fluid or air path from an interior of the sensor housing 102 to an exterior of the sensor housing 102. In this configuration, the side vents 302 are configured to reduce or remove condensation from within the sensor housing 102. The sensor housing 102 may comprise any suitable number of side vents 302. In FIGS. 3-5B, the side vents are shown as oval slots. In other examples, the side vents 302 may be any other suitable shape. Additional details about the configuration of the side vents 302 are described in FIG. 10.

In some embodiments, the sensor housing 102 may comprise one or more buttons or switches for controlling the operation of electronics that are within the sensor housing 102. For example, the sensor housing 102 may comprise a power switch, a reset button, a wireless connection button, LEDs, or any other type of mechanism that is configured to control the operation of electronics within the sensor housing 102. For instance, the sensorhousing 102 may comprise one or more LEDS that are configured to indicate a wireless pairing status, a connection status with a thermostat, or any other suitable type of status. In this example, the LED may be configured to use different colors and/or flash patterns to indicate a status.

Figure 6:
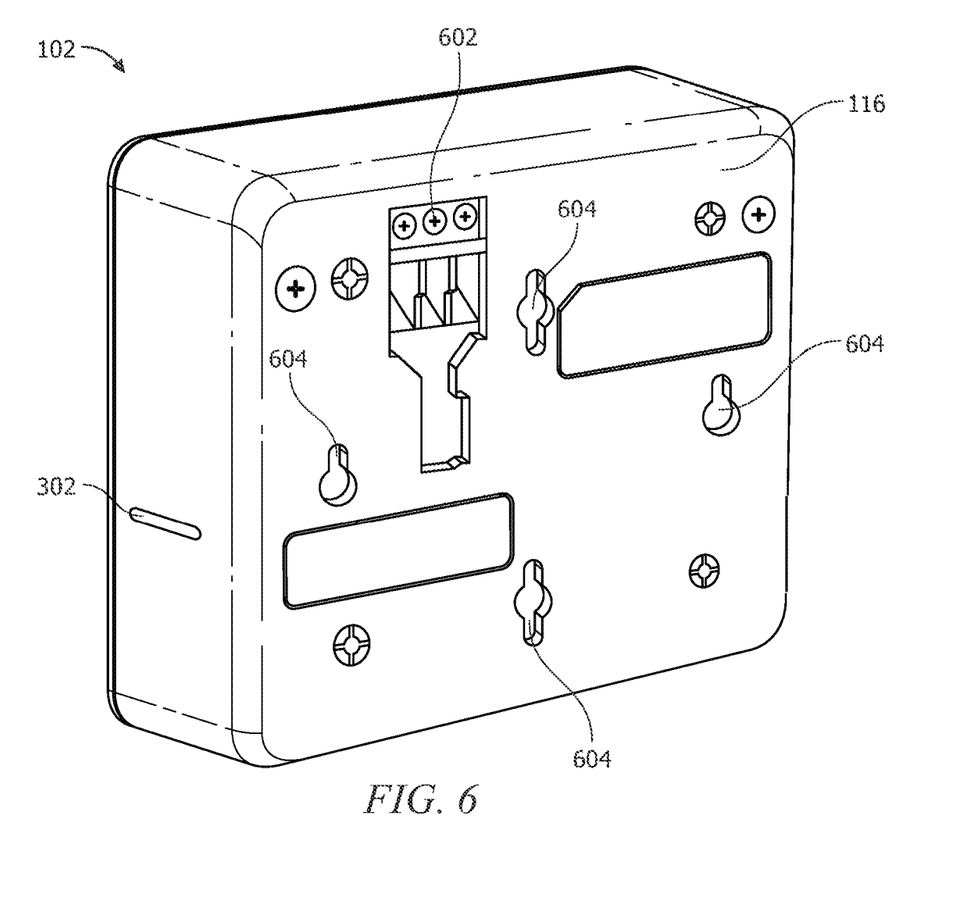
FIG. 6 is a back perspective view of an embodiment of the sensor housing of the air quality measuring device.

FIG. 6 is a back perspective view of an embodiment of the sensor housing 102 of the air quality measuring device 100. As previously discussed in FIG. 1, the sensor housing 102 may comprise a plurality of interfaces 604 that is configured to receive and couple with interfaces 122 on the mounting plate 106 to couple the sensor housing 102 with the mounting plate 106.

In some embodiments, the sensor housing 102 may further comprise an electrical interface 602. Examples of the electrical interface 602 include, but are not limited to, a screw terminal, a terminal strip, crimp terminals, battery terminals, or any other suitable type of interface for coupling electrical wires. The electrical interface 602 is an interface that is configured to allow electronics within the sensor housing 102 to communicate with other devices. For example, the electrical interface 602 may be configured to couple to an electrical power source (e.g. a battery or AC mains) to provide power to electronics within the sensor housing 102. As another example, the electrical interface 602 may be configured to couple to a controller (e.g. a hardware processor) which allows the controller to control the operation of electronics within the sensor housing 102, to send data or instructions to the electronics within the sensor housing 102, and/or to receive data from the electronics within the sensor housing 102. In other examples, the sensor housing 102 may further comprise any other suitable type of interface for coupling and communicating with other devices.

Interior of the Sensor Housing

Figure 7:
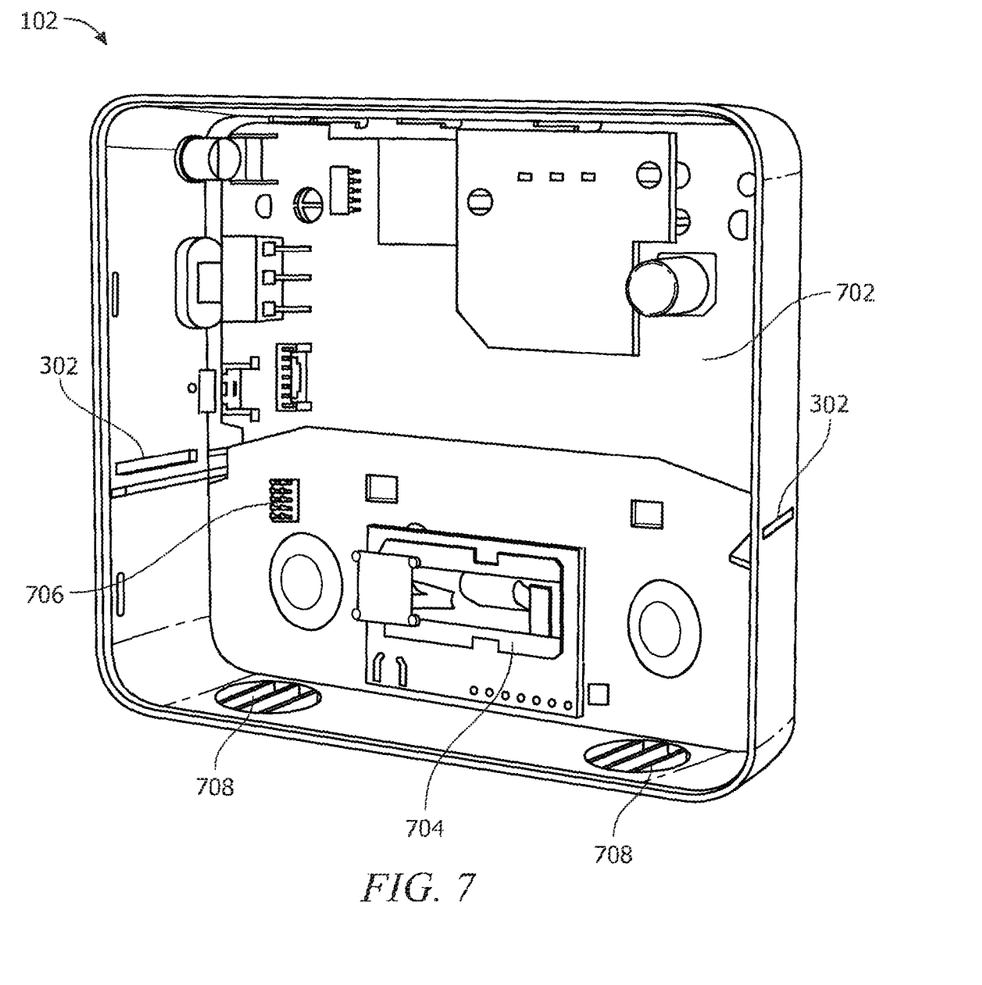
FIG. 7 is a perspective view of an embodiment of an interior portion of the sensor housing of the air quality measuring device.

FIG. 7 is a perspective view of an embodiment of an interior portion of the sensor housing 102 of the air quality measuring device 100. The sensor housing 102 further comprises one or more printed circuit boards (PCBs) that are configured to control the operation of a plurality of sensors. In one embodiment, the sensor housing 102 comprises a $CO_2$ sensor 704, a particulate sensor 808, and a TVOC sensor 706. The $CO_2$ sensor 704 is configured to measure a carbon dioxide level that is present within a volume of air and to output an electrical signal that indicates the carbon dioxide level that was measured. Examples of $CO_2$ sensors 704 include, but are not limited to, non-dispersive infrared sensors, electrochemical sensors, photoacoustic sensors, and metal oxide semiconductor sensors. The particulate sensor 808 is configured to measure a particulate matter level that is present within a volume of air and to output an electrical signal that indicates the particulate matter level that was measured. Examples of particulate sensors 808 include, but are not limited to, infrared sensors and laser diffraction sensors. The particulate sensor 808 may be configured to measure coarse particles (PM 10), fine particles (PM 2.5), and/or ultrafine particles (PM 0.1). The TVOC sensor 706 is configured to measure a TVOC level that is present within a volume of air and to output an electrical signal that indicates the TVOC level that was measured. Examples of TVOC sensors 706 include, but are not limited to, photoionization detectors, flame ionization detectors, and metal oxide semiconductor sensors. In other examples, the sensor housing 102 may further comprise any other suitable type of sensors or combination of sensors.

Figure 8:
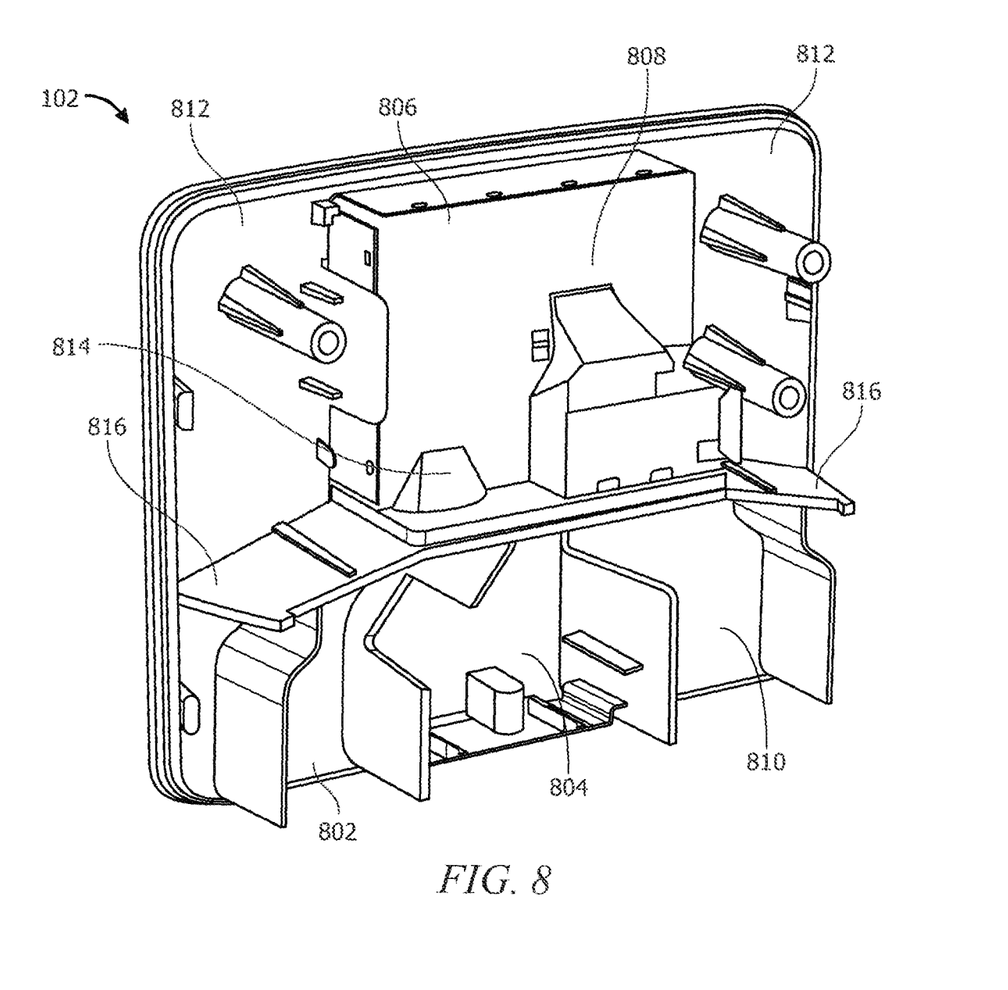
FIG. 8 is another perspective view of an embodiment of an interior portion of the sensor housing of the air quality measuring device.

FIG. 8 is another perspective view of an embodiment of an interior portion of the sensor housing 102 of the air quality measuring device 100. The sensor housing 102 comprises a plurality of chambers 802, 804, 806, 810, and 812. The chambers 802, 804, 806, 810, and 812 may be formed using plastics, metals, or any other suitable type of material. The chambers 802, 804, 806, 810, and 812 are generally configured to provide airflow paths within the sensor housing 102 that direct air to the sensors disposed within the sensor housing 102. An example of the airflow paths formed by the chambers 802, 804, 806, 810, and 812 is described in FIG. 9.

In one embodiment, the sensor housing 102 comprises one or more angled surfaces 816 that are configured to provide fluid paths for one or more surfaces within the sensor housing 102 to the exterior of the sensor housing 102 via a side vent 302. The angled surface 816 may have a five-degree downward angle, a ten-degree downward angle, a fifteen-degree downward, or any other suitable downward angle.

Airflow Paths within the Air Quality Measuring Device

Figure 9:
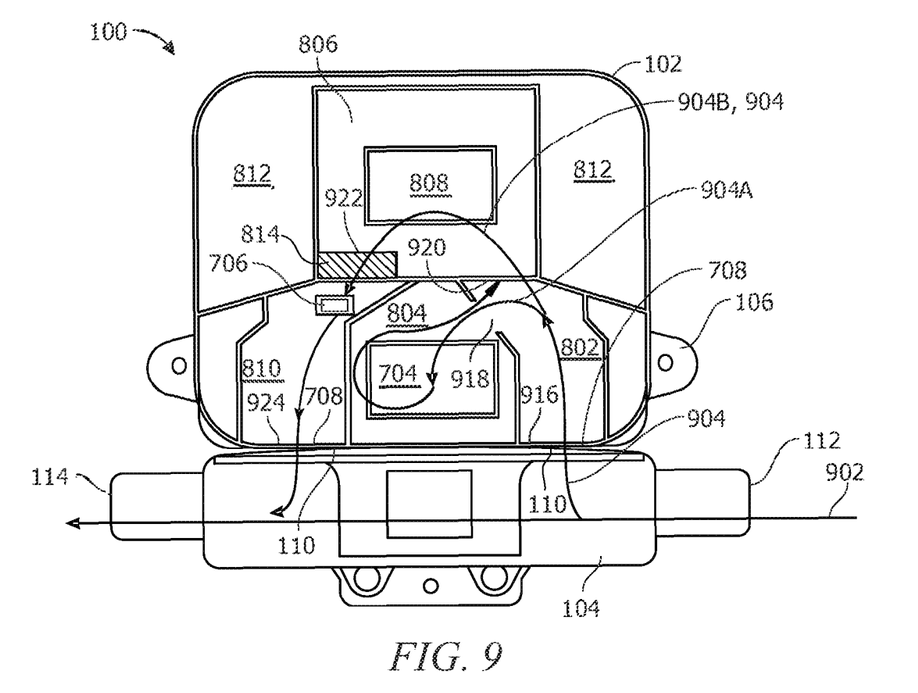
FIG. 9 is a cutaway view of an embodiment of the air quality measuring device providing airflow paths within the air quality measuring device.

FIG. 9 is a cutaway view of an embodiment of the air quality measuring device 100 providing airflow paths within the air quality measuring device 100. FIG. 9 illustrates an example of how an airflow 902 is directed towards the chambers and sensors that are disposed within the air quality measuring device 100. In this example, the bypass housing 104 is configured to receive an airflow 902 from an HVAC system at an inlet opening 112. The bypass housing 104 is configured to direct a first portion of the airflow 904 towards an opening 916 (e.g. outlet opening 110) in the bypass housing 104. The bypass housing 104 is further configured to direct a second portion of the airflow 902 towards an outlet opening 114 of the bypass housing 104.

The sensor housing 102 is configured to receive the airflow 904 at an opening 916 (e.g. opening 708) of a first chamber 802 of the sensor housing 102. The sensor housing 102 is further configured to direct a first portion 904A of the airflow 904 from the first chamber 802 towards an opening 918 of a second chamber 804 and a second portion 904B of the airflow 904 from the first chamber 802 towards an opening 920 of a third chamber 806. In this example, the second portion 904B of the airflow 904 that is directed towards the third chamber 806 has a higher flow rate than the first portion 904A of the airflow 904 that is directed towards the second chamber 804.

In one embodiment, a $CO_2$ sensor 704 is disposed within the second chamber 804. The opening 918 acts as an inlet for the second chamber 804 that is configured to direct the first portion 904A of the airflow 904 towards the $CO_2$ sensor 704. In this configuration, the $CO_2$ sensor 704 is configured to sense the first portion 904A of the airflow 904 to measure a carbon dioxide level of the first portion 904A of the airflow 904. The $CO_2$ sensor 704 may output the measured carbon dioxide level to one or more hardware processors within the sensor housing 102 and/or external from the sensor housing 102.

In one embodiment, a fan 814 and a particulate sensor 808 are disposed within the third chamber 806. For example, the fan 814 may be located at the opening 922 of the third chamber 806 and configured to actively draw the second portion 904B of the airflow 904 into the third chamber 806. In this example, the fan 814 may provide or induce the higher flow rate of the second portion 904B of the airflow 904. The opening 920 acts as an inlet for the third chamber 806 that is configured to direct the second portion 904B of the airflow 904 towards the particulate sensor 808 and an outlet opening 922 in the third chamber 806 towards a fourth chamber 810. In this configuration, the particulate sensor 808 is configured to sense the second portion 904B of the airflow 904 before it exits the third chamber 806 to measure a particulate level of the second portion 904B of the airflow 904. The particulate sensor 808 may output the measured particulate level to one or more hardware processors within the sensor housing 102 and/or external from the sensor housing 102. In some embodiments, the third chamber 806 may comprise one or more other types of sensors disposed within the third chamber 806. In this case, the one or more other types of sensor may be configured to measure any other suitable type of characteristics of the air within the third chamber 806.

In one embodiment, a TVOC sensor 706 is disposed within the fourth chamber 810. The opening 922 acts as an inlet for the fourth chamber 810 that is configured to direct the second portion 904B of the airflow 904 towards the TVOC sensor 706 and an outlet opening 924 in the fourth chamber 810. In this configuration, the TVOC sensor 706 is configured to sense the second portion 904B of the airflow 904 before it exits the fourth chamber 810 to measure a TVOC level in the second portion 904B of the airflow 904. The TVOC sensor 706 may output the measured TVOC level to one or more hardware processors within the sensor housing 102 and/or external from the sensor housing 102.

The bypass housing 104 is further configured to receive the second portion 904B of the airflow 904 from the fourth chamber 810 of the sensor housing 102 and to combine the received airflow with the airflow that bypasses the sensor housing 102. The bypass housing 104 outputs the combined airflow via the outlet opening 114 in the bypass housing 104.

Fluid Flow Paths within the Air Quality Measuring Device

Figure 10:
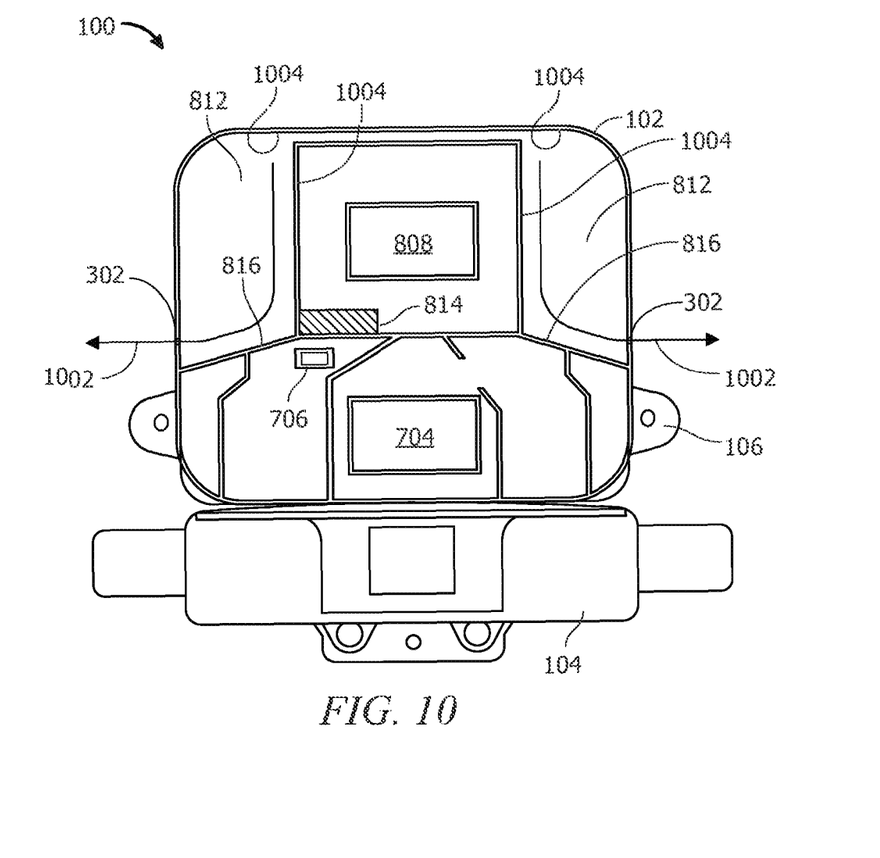
FIG. 10 is a cutaway view of an embodiment of the air quality measuring device providing fluid flow paths from an interior to an exterior of the air quality measuring device.

FIG. 10 is a cutaway view of an embodiment of the air quality measuring device 100 providing fluid flow paths from an interior to an exterior of the air quality measuring device 100. FIG. 10 illustrates an example of how a fluid (e.g. condensate) can be routed from interior surfaces 1004 of the sensor housing 102 to the exterior of the sensor housing 102. In this example, when condensate begins to form and accumulate within the sensor housing 102, the condensate will fall onto one or more of the angled surfaces 816 within the sensor housing 102. The angled surfaces 816 are configured to provide a fluid flow path 1002 that directs the condensate to the side vents 302 of the sensor housing 102. In this configuration, the condensate follows the fluid flow path 1002 and exits the interior of the sensor housing 102 via the side vents 302 of the sensor housing 102. This feature prevents condensate from accumulating within the sensor housing 102 which may damage the electronics within the sensor housing 102.

Air Quality Measuring Process

Figure 11:
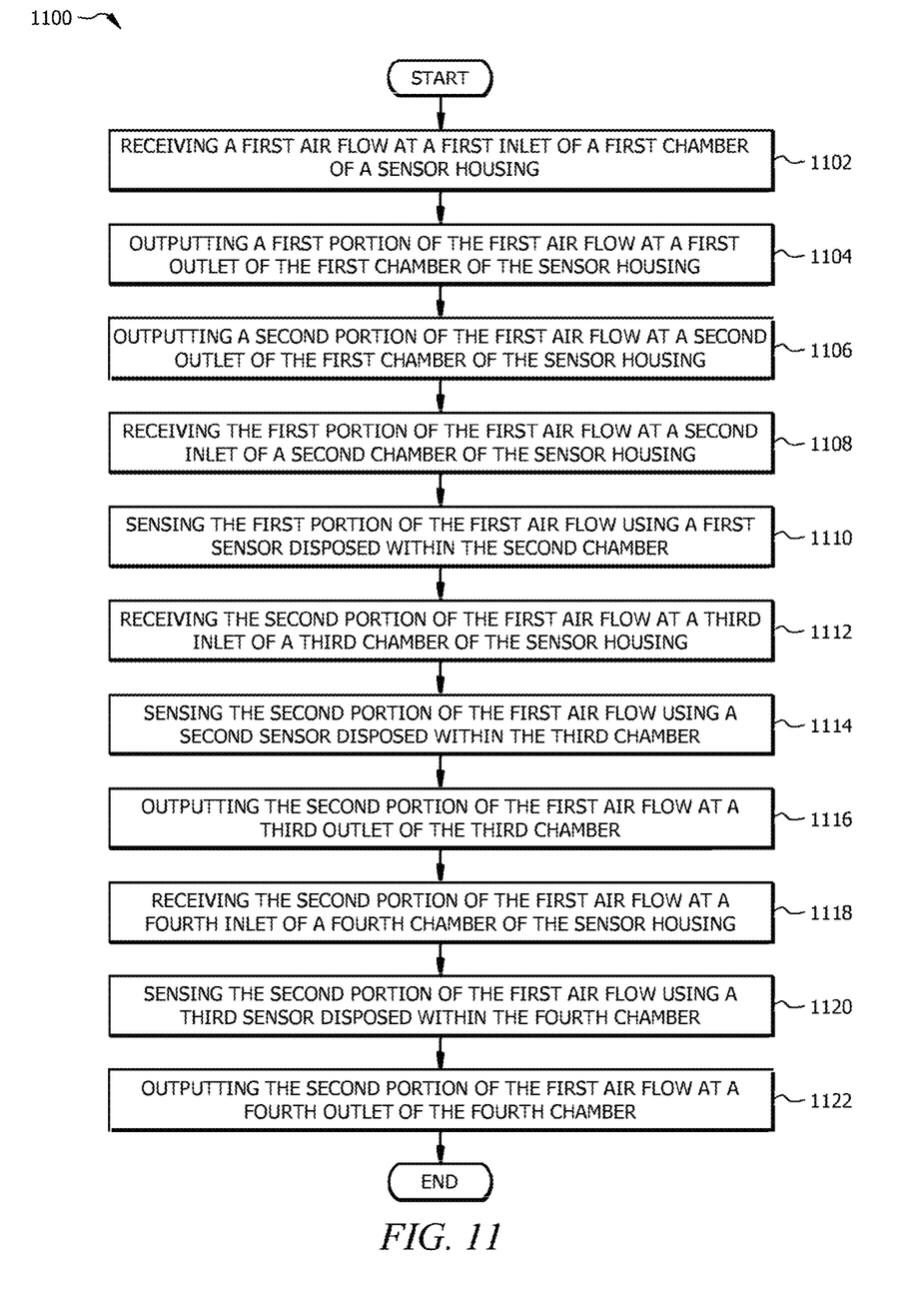
FIG. 11 is a flowchart of an embodiment of an air quality measuring process using the air quality measuring device.

FIG. 11 is a flowchart of an embodiment of an air quality measuring process 1100 using the air quality measuring device 100. The air quality measuring device 100 employs process 1100 to direct an airflow towards the chambers and sensors that are disposed within the air quality measuring device 100 to perform measurements on the airflow and to determine the quality of the airflow.

At operation 1102, the air quality measuring device 100 receives an airflow 902 at a first inlet of a first chamber 802 of the sensor housing 102. Referring to the example in FIG. 9, the sensor housing 102 receives a portion 904 of an airflow 902 from an HVAC system via the bypass housing 104. In other examples, the sensor housing 102 may receive the airflow 902 directly from the HVAC system when the bypass housing 104 is not installed. The sensor housing 102 receives the portion 904 of the airflow 902 at an inlet opening 916 of a first chamber 802 of the sensor housing 102.

Returning to FIG. 11 at operation 1104, the air quality measuring device 100 outputs a first portion 904A of the airflow 904 at a first outlet of the first chamber 802 of the sensor housing 102. Continuing with the example in FIG. 9, a first portion 904A of the airflow 904 is directed towards the second chamber 804 of the sensor housing 102 via opening 918. The first portion 904A of the airflow 904 has a first flow rate.

Returning to FIG. 11 at operation 1106, the air quality measuring device 100 outputs a second portion 904B of the airflow 904 at a second outlet of the first chamber 802 of the sensor housing 102. Continuing with the example in FIG. 9, a second portion 904B of the airflow 904 is directed towards the third chamber 806 of the sensor housing 102 via opening 920. The second portion 904B of the airflow 904 has a second flow rate that is greater than the first flow rate. In this example, the second flow rate is controlled and provided by a fan 814 that is disposed at the outlet 922 of the third chamber 806 to draw air into the third chamber 806.

Returning to FIG. 11 at operation 1108, the air quality measuring device 100 receives the first portion 904A of the airflow 904 at a second inlet of a second chamber 804 of the sensor housing 102. Continuing with the example in FIG. 9, the first portion 904A of the airflow 904 is received by the second chamber 804 at the opening 918 and is directed towards a first sensor 704 that is disposed within the second chamber 804. After the first portion 904A of the air flow 904 enters the second chamber 804, the first portion 904A of the air flow 904 may exit the second chamber 804 via the opening 918 to recombine with the airflow in the first chamber 802 to form the second portion 904B of the air flow 904 such that there is no net flow loss for the air flow that enters the air quality measuring device 100.

Returning to FIG. 11 at operation 1110, the air quality measuring device 100 senses the first portion 904A of the airflow 904 using a first sensor 704 disposed within the second chamber 804. Continuing with the example in FIG. 9, the first sensor 704 may be a CO2 sensor. In this example, the CO2 sensor 704 senses the first portion 904A of the airflow 904 to measure a carbon dioxide level of the first portion 904A of the airflow 904. The CO2 sensor 704 then outputs the measured carbon dioxide level to one or more hardware processors within the sensor housing 102 and/or external from the sensor housing 102. In other examples, the second chamber 804 may comprise any other suitable type of low flow sensor that is configured to measure the characteristics of the first portion 904A of the airflow 904.

Returning to FIG. 11 at operation 1112, the air quality measuring device 100 receives the second portion 904B of the airflow 904 at a third inlet of a third chamber 806 of the sensor housing 102. Continuing with the example in FIG. 9, the second portion 904B of the airflow 904 is received by the third chamber 806 at the opening 920 and is directed towards a second sensor 808 that is disposed within the third chamber 806.

Returning to FIG. 11 at operation 1114, the air quality measuring device 100 senses the second portion 904B of the airflow 904 using a second sensor 808 disposed within the third chamber 806. Continuing with the example in FIG. 9, the second sensor 808 may be a particulate sensor. In this example, the particulate sensor 808 senses the second portion 904B of the airflow 904 before it exits the third chamber 806 to measure a particulate level of the second portion 904B of the airflow 904. The particulate sensor 808 then outputs the measured particulate level to one or more hardware processors within the sensor housing 102 and/or external from the sensor housing 102.

Returning to FIG. 11 at operation 1116, the air quality measuring device 100 outputs the second portion 904B of the airflow 904 at a third outlet of the third chamber 806. Continuing with the example in FIG. 9, the second portion 904B of the airflow 904 is directed towards the fourth chamber 810 of the sensor housing 102 via opening 922.

Returning to FIG. 11 at operation 1118, the air quality measuring device 100 receives the second portion 904B of the airflow 904 at a fourth inlet of a fourth chamber 810 of the sensor housing 102. Continuing with the example in FIG. 9, the second portion 904B of the airflow 904 is received by the fourth chamber 810 at the opening 922 and is directed towards a third sensor 706 that is disposed within the fourth chamber 810.

Returning to FIG. 11 at operation 1120, the air quality measuring device 100 senses the second portion 904B of the airflow 904 using a third sensor 706 disposed within the fourth chamber 810. Continuing with the example in FIG. 9, the third sensor 706 may be a TVOC sensor. In this example, the TVOC sensor 706 senses the second portion 904B of the airflow 904 before it exits the fourth chamber 810 to measure a TVOC level in the second portion 904B of the airflow 904. The TVOC sensor 706 then output the measured TVOC level to one or more hardware processor within the sensor housing 102 and/or external from the sensor housing 102.

Returning to FIG. 11 at operation 1122, the air quality measuring device 100 outputs the second portion 904B of the airflow 904 at a fourth outlet of the fourth chamber 810. Continuing with the example in FIG. 9, the second portion 904B of the airflow 904 is directed towards out of the sensor housing 102 via opening 924. In this example, the second portion 904B of the airflow 904 may be directed back to the bypass housing 104 where it may be combined with an airflow that is passing through the bypass housing 104. In other examples, the second portion 904B of the airflow 904 may be directed back to an HVAC system or introduced into a space.

In some embodiments, one or more the sensors (i.e. CO2 sensor 704, particulate sensor 808, and TVOC sensor 706) may be optional and omitted. In this case, the operations associated with using these sensors may also be omitted.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An air quality measuring device, comprising:
a first housing comprising:
a first chamber comprising:
a first inlet configured to receive a first airflow;
a first outlet configured to receive a first portion of the first airflow; and
a second outlet configured to receive a second portion of the first airflow;
a second chamber comprising:
a second inlet configured to receive the first portion of the first airflow; and
a first sensor disposed within the second chamber, wherein the first sensor is configured to sense the first portion of the first airflow;
a third chamber comprising:
a third inlet configured to receive the second portion of the first airflow;
a third outlet to output the second portion of the first airflow; and
a second sensor disposed within the third chamber, wherein the second sensor is configured to sense the second portion of the first airflow; and
a fourth chamber comprising:
a fourth inlet configured to receive the second portion of the first airflow;
a fourth outlet configured to output the second portion of the first airflow; and
a third sensor disposed within the fourth chamber, wherein the third sensor is configured to sense the second portion of the first airflow.

2. The device of claim 1, further comprising:
a second housing coupled to the first housing, comprising:
a fifth chamber comprising:
a fifth inlet configured to receive a second airflow;
a fifth outlet configured to output a first portion of the second airflow that corresponds with the first airflow to the first housing;
a sixth inlet configured to receive the second portion of the first airflow from the first housing; and
a sixth outlet configured to output the second portion of the first airflow and a second portion of the second airflow.

3. The device of claim 1, wherein the first sensor is configured to measure a carbon dioxide level within the second chamber.

4. The device of claim 1, wherein the second sensor is configured to measure a particulate level within the third chamber.

5. The device of claim 1, wherein the third sensor is configured to measure a Total Volatile Organic Compound level within the fourth chamber.

6. The device of claim 1, wherein the first housing further comprises a fifth chamber comprising:
a side vent configured to provide a fluid path from the fifth chamber to an exterior of the first housing; and
an angled surface configured to provide a fluid path from one or more surfaces within the fifth chamber to the side vent.

7. The device of claim 1, wherein the third outlet comprises a fan configured to provide a flow rate of the second portion of the first airflow.

8. An air quality measuring method, comprising:
receiving a first airflow at a first inlet of a first chamber of a first housing;
outputting a first portion of the first airflow at a first outlet of the first chamber of the first housing;
outputting a second portion of the first airflow at a second outlet of the first chamber of the first housing;
receiving the first portion of the first airflow at a second inlet of a second chamber of the first housing;
sensing the first portion of the first airflow using a first sensor disposed within the second chamber;
receiving the second portion of the first airflow at a third inlet of a third chamber of the first housing;
sensing the second portion of the first airflow using a second sensor disposed within the third chamber;
outputting the second portion of the first airflow at a third outlet of the third chamber;
receiving the second portion of the first airflow at a fourth inlet of a fourth chamber of the first housing;
sensing the second portion of the first airflow using a third sensor disposed within the fourth chamber; and
outputting the second portion of the first airflow at a fourth outlet of the fourth chamber.

9. The method of claim 8, further comprising:
receiving a second airflow at a fifth inlet of a fifth chamber of a second housing that is coupled to the first housing;
outputting at a fifth outlet of the fifth chamber a first portion of the second airflow that corresponds with the first airflow to the first housing;
receiving at a sixth inlet of the fifth chamber the second portion of the first airflow from the first housing; and
outputting at a sixth outlet the second portion of the first airflow and a second portion of the second airflow.

10. The method of claim 8, wherein sensing using the first sensor comprises measuring a carbon dioxide level within the second chamber.

11. The method of claim 8, wherein sensing using the second sensor comprises measuring a particulate level within the third chamber.

12. The method of claim 8, wherein sensing using the third sensor comprises measuring a Total Volatile Organic Compound level within the fourth chamber.

13. The method of claim 8, further comprising providing by an angled surface within a fifth chamber of the first housing a fluid path from one or more surfaces within the fifth chamber to a side vent, wherein the side vent is configured to provide a fluid path from the fifth chamber to an exterior of the first housing.

14. The method of claim 8, further comprising providing a flow rate of the second portion of the first airflow using a fan disposed within the third outlet.

15. An air quality measuring device, comprising:
a first housing comprising:
a first chamber comprising:
a first inlet configured to receive a first airflow;
a first outlet configured to receive a first portion of the first airflow; and
a second outlet configured to receive a second portion of the first airflow;
a second chamber comprising:
a second inlet configured to receive the first portion of the first airflow; and
a first sensor disposed within the second chamber, wherein the first sensor is configured to sense the first portion of the first airflow;
a third chamber comprising:
a third inlet configured to receive the second portion of the first airflow;
a third outlet to output the second portion of the first airflow; and
a second sensor disposed within the third chamber, wherein the second sensor is configured to sense the second portion of the first airflow; and
a fourth chamber comprising:
a fourth inlet configured to receive the second portion of the first airflow;
a fourth outlet configured to output the second portion of the first airflow; and
a third sensor disposed within the fourth chamber, wherein the third sensor is configured to sense the second portion of the first airflow; and
a second housing coupled to the first housing, comprising:
a fifth chamber comprising:
a fifth inlet configured to receive a second airflow;
a fifth outlet configured to output a first portion of the second airflow that corresponds with the first airflow to the first housing;
a sixth inlet configured to receive the second portion of the first airflow from the first housing; and
a sixth outlet configured to output the second portion of the first airflow and a second portion of the second airflow.

16. The device of claim 15, wherein the first sensor is configured to measure a carbon dioxide level within the second chamber.

17. The device of claim 15, wherein the second sensor is configured to measure a particulate level within the third chamber.

18. The device of claim 15, wherein the third sensor is configured to measure a Total Volatile Organic Compound level within the fourth chamber.

19. The device of claim 15, wherein the first housing further comprises a sixth chamber comprising:
a side vent configured to provide a fluid path from the sixth chamber to an exterior of the first housing; and
an angled surface configured to provide a fluid path from one or more surfaces within the sixth chamber to the side vent.

20. The device of claim 15, wherein the third outlet comprises a fan configured to provide a flow rate of the second portion of the first airflow.

* * * * *